United States Patent [19]

Yamamoto

[11] 3,967,288
[45] June 29, 1976

[54] ELECTRIC SHUTTER OPERATING CIRCUITS

[75] Inventor: Masaru Yamamoto, Machida, Japan

[73] Assignee: Yashica Co., Ltd., Tokyo, Japan

[22] Filed: Aug. 29, 1974

[21] Appl. No.: 501,505

[30] Foreign Application Priority Data

Sept. 6, 1973    Japan.................. 48-103918[U]

[52] U.S. Cl. ............................... 354/60 L; 354/50; 354/51; 354/53
[51] Int. Cl.² .................................................. G03B 7/00
[58] Field of Search................ 354/54, 50, 51, 60 R, 354/60 E, 60 L, 53; 356/226

[56] References Cited
UNITED STATES PATENTS

| | | | |
|---|---|---|---|
| 3,436,158 | 4/1969 | Schmitt................... | 354/60 L |
| 3,581,643 | 6/1971 | Yoshimura................ | 354/54 |
| 3,594,088 | 7/1971 | Akiyama et al........... | 354/60 L |
| 3,745,902 | 7/1973 | Taguchi................... | 354/51 |
| 3,765,006 | 10/1973 | Takahashi et al........ | 356/226 |
| 3,849,769 | 11/1974 | Chiba..................... | 354/60 L |

Primary Examiner—L. T. Hix
Assistant Examiner—Russell E. Adams, Jr.
Attorney, Agent, or Firm—Charles E. Pfund

[57] ABSTRACT

In an electronic shutter operating circuit for use in a photographic camera a differential amplifier comprising a pair of transistors is provided for comparing the photosensitivity of the film used and the brightness of the object to display over exposure and under exposure conditions. A voltage is positively fed back from the output of the differential amplifier to the input thereof to cause it to oscillate for displaying the correct exposure condition. There is provided a transfer switch to cause the differential amplifier to respond to the selected shutter time for closing the shutter when the shutter time expires.

5 Claims, 1 Drawing Figure

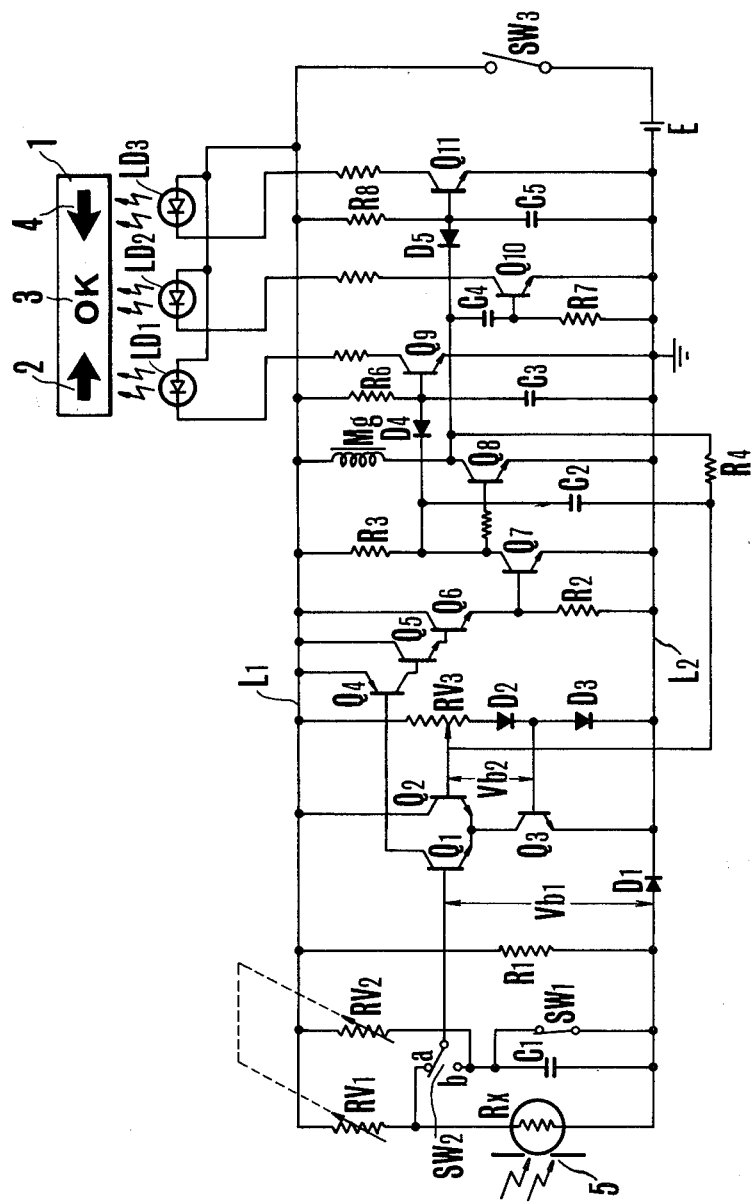

ELECTRIC SHUTTER OPERATING CIRCUITS

BACKGROUND OF THE INVENTION

This invention relates to an electric shutter operating circuit for use in photographic cameras.

The electric shutter operating circuit for use in photographic cameras is constructed to connect the amount of the light received from an object into an electric signal, to determine the photographing conditions commensurate with the brightness of the object in accordance with the electrical signal, to indicate to the user whether the iris opening and the shutter time are correct or not and to control the operation of the shutter.

In the past, various types of electric shutter operating circuits have been proposed, but prior art circuits were constructed to indicate the correct value or incorrect value of the exposure for a particular brightness of the object by merely representing over exposure and under exposure or correct exposure to the user of the camera. Accordingly, in the former case, absence of the display of the over or under exposure means the correct exposure. However, the correct exposure is also not displayed in a case of the fault of electric power source or electric circuit thus resulting in the failure of photographing or giving a feeling of uncertainty to the user. In the latter case, where the exposure is incorrect, the user cannot judge whether the exposure is over or under.

Furthermore, in the prior art electric shutter operating circuit, as the shutter control circuit and the exposure display circuit were provided independently, there was a defect that the entire circuit was complicated and expensive.

SUMMARY OF THE INVENTION

Accordingly, it is an object of this invention to provide an improved electric shutter operating circuit of relatively simple circuit construction for use in a photographic camera that can display not only the over exposure and under exposure conditions but also the correct exposure condition.

Another object of this invention is to provide an improved electric shutter operating circuit which can not only display the over exposure, under exposure and correct exposure conditions, but also control the shutter time.

According to this invention, these objects can be accomplished by providing an electric shutter operating circuit for use in a photographic camera, comprising means responsive to the brightness of an object to be photographed, a first transistor normally connected to respond to the output of the brightness responsive means, a resistor set in accordance with the photosensitivity of the photographic film used, a second transistor connected to respond to the output voltage of the resistor, means to connect the first and second transistors to act as a differential amplifier, means responsive to the output of the differential amplifier which is produced when the differential amplifier is unbalanced for operating display means to display an over exposure or an under exposure condition, means responsive to the balanced condition of the differential amplifier for providing a positive feedback to the differential amplifier thereby causing the same to oscillate, and means responsive to the oscillation of the differential amplifier for displaying a correct exposure condition.

According to another feature of this invention, the electric shutter operating circuit just described further comprises a variable resistor which is set in accordance with a predetermined shutter time, a capacitor connected to be charged through the variable resistor, a switch normally short circuiting the capacitor and arranged to be opened when the shutter of the camera is opened, an electromagnet associated with the shutter and connected on the output side of the differential amplifier, and a transfer switch operated concurrently with said capacitor switch for connecting the first transistor to be responsive to the terminal voltage of the capacitor so that as the capacitor is charged up the differential amplifier operates the electromagnet to close the shutter.

BRIEF DESCRIPTION OF THE DRAWING

A single FIGURE of the accompanying drawing shows a connection diagram of one embodiment of the novel electric shutter operating circuit embodying the invention.

DESCRIPTION OF THE PREFERRED EMBODIMENT

Referring now to the accompanying drawing, the electric shutter operating circuit shown therein comprises a photoconductive element $R_x$ which varies its resistance in accordance with the brightness of the object, not shown, and is connected in series to a variable resistor $RV_1$, a switch $SW_1$ which is arranged to be opened when a shutter, not shown, of a photographic camera is operated, and a capacitor $C_1$ connected in parallel with the switch $SW_1$, the capacitor $C_1$ being connected to be charged through a variable resistor $RV_2$ interlocked with the variable resistor $RV_1$ when the switch $SW_1$ is opened. There is also provided a transfer switch $SW_2$ for switching the connection between the charging voltage of the capacitor $C_1$ and the voltage created by the photoconductive element $R_x$. Although not shown in the drawing the transfer switch $SW_2$ is interlocked with a release button, not shown, of the camera such that the movable contact of the transfer switch is normally thrown to contact, $a$, connected to the photoconductive element $R_x$, but thrown to contact, $b$, connected to capacitor $C_1$ in response to the opening operation of the shutter. The voltage appearing at the movable contact of the transfer switch $SW_2$ is impressed upon the base electrode of a transistor $Q_1$ which constitutes a differential amplifier together with the other transistor $Q_2$. The base electrode of transistor $Q_2$ is connected to the sliding arm of a variable resistor $RV_3$ which is varied in accordance with the photosensitivity (ASA) of the photographic film used. The variable resistor $RV_3$ is connected, in series to a series connection of diodes $D_2$ and $D_3$ adapted to compensate for the temperature characteristics of transistor $Q_2$, across a source conductor $L_1$ and a conductor $L_2$ maintained at a reference or ground potential. A transistor $Q_3$ acting as a source of constant current is connected to the emitter electrodes of both transistors $Q_1$ and $Q_2$ and the base electrode of the transistor $Q_3$ is connected to the juncture between diodes $D_2$ and $D_3$ so as to be impressed with the forward voltage of the diode $D_3$ thereby maintaining a constant current. The other or lower terminals of switch $SW_1$, capacitor $C_1$ and photoconductive element $R_x$ are connected to the conductor $L_2$ of the reference potential through a diode $D_1$ which is connected to the source conductor $L_1$ via a resistor $R_1$ so that said other terminals of switch $SW_1$, capacitor $C_1$ and photoconductive element $R_x$ are maintained at a higher voltage than the reference potential by the forward voltage drop across the diode $D_1$. The polarity of the collector output of transistor $Q_1$ is inverted by the operation of cascade connected transistors $Q_4$, $Q_5$ and $Q_6$ and is then applied to one terminal of resistor $R_2$ connected between the emitter electrode of transistor $Q_6$ and conductor $L_2$ of the reference voltage.

The polarity of the signal generated across resistor $R_2$ is inverted by a transistor $Q_7$ having its emitter electrode grounded, and the polarity of the signal generated at the collector electrode of the transistor $Q_7$ is inverted by a transistor $Q_8$ with its emitter electrode grounded. Further, the output from the collector electrode of transistor $Q_7$ is coupled to the base electrode of a transistor $Q_9$ through a diode $D_4$ for preventing reverse current, the emitter electrode of transistor $Q_9$ being also grounded. A capacitor $C_3$ is connected across the base-emitter electrodes of transistor $Q_9$ such that when transistor $Q_7$ is nonconductive, diode $D_4$ is disconnected and capacitor $C_3$ is charged from the source conductor $L_1$ through a resistor $R_6$ with a time constant of $R_6 C_3$, and that as transistor $Q_9$ is turned on by the terminal voltage of capacitor $C_3$ a display lamp $LD_1$ for over exposure is lighted.

On the other hand, the collector output of transistor $Q_8$ is coupled through a diode $D_5$ to the base electrode of transistor $Q_{11}$ with its emitter electrode grounded so that when transistor $Q_8$ is rendered off, the diode $D_5$ is disconnected and the capacitor $C_5$ is charged by the source conductor $L_1$ via a resistor $R_8$. When transistor $Q_{11}$ is rendered on a display lamp $LD_3$ for the under exposure is lighted. As described in detail later, an alternating collector output of transistor $Q_8$ is applied through a capacitor $C_4$ to the base electrode of a transistor $Q_{10}$ with its emitter electrode grounded so that transistor $Q_{10}$ is rendered alternately on and off, thereby alternately lighting and extinguishing a display lamp $LD_2$ for a correct exposure. To this end, the collector output of transistor $Q_8$ is fedback to the base electrode of transistor $Q_2$ through an integrating circuit comprising resistor R4 and capacitor $C_2$. The upper terminal of capacitor $C_2$ is connected to the collector electrode of transistor $Q_7$. It is constructed such that the time constant provided by resistor $R_4$ and capacitor $C_2$ is sufficiently smaller than the time constants provided by resistor $R_6$ and capacitor $C_3$, and resistor $R_8$ and capacitor $C_5$ and that the resistance value of variable resistor $RV_2$ varies exponentially.

The source conductor $L_1$ is connected to one pole of a DC source E through a source switch $SW_3$. The lighting and extinguishment of respective display lamps $LD_1$, $LD_2$ and $LD_3$ illuminate suitable display letters, arrows or the like symbols of a display board 1 to display the degree of exposure.

The electric shutter operating circuit described above operates as follows. At first switch $SW_1$ is closed, and the movable contact of the transfer switch $SW_2$ is thrown to contact, $a$, connected to the photoconductive element $R_x$ and the variable resistor $RV_3$ is set to a predetermined value in accordance with the photosensitivity ASA of the film. Under these conditions, when the release button is depressed, source switch $SW_3$ is closed to connect the source line $L_1$ to the DC source E. As the photoconductive element $R_x$ manifests a resistance value corresponding to the brightness of the object, the base voltage of transistor $Q_1$ will be given by an equation $$V_{b1} = \frac{r_x}{r_x + r_{v1}} \cdot e$$

where $V_{b1}$ represents the voltage between the base electrode of transistor $Q_1$ and the anode electrode of diode $D_1$, $r_x$ the resistance value of the photoconductive element $R_x$, $r_{v1}$ the resistance value of the variable resistor $R_{v1}$, and $e$ the voltage value of the source E. The voltage $V_{b2}$ between the base electrode of transistor $Q_2$ and the anode electrode of diode $D_3$ is determined by the variable resistor $RV_3$ and there is a relation $V_{b1} + V_{off} = V_{b2}$ between the voltages $V_{b1}$ and $V_{b2}$, this relation maintaining transistors $Q_1$ and $Q_2$ in an equilibrium condition, where $V_{off}$ represents the offset voltage of the transistors.

Where the brightness of the object is large to satisfy a relation $V_{b1} < V_{b2} - V_{off}$, then transistors $Q_1$, $Q_4$, $Q_5$, $Q_6$ and $Q_7$ are all rendered off, whereas transistor $Q_8$ is on. In consequence transistor $Q_9$ is rendered on and transistors $Q_{10}$ and $Q_{11}$ off. The on-state of transistor $Q_7$ lights display lamp $LD_1$ to illuminate an arrow 2 on the display board 1 so as to indicate that the combination of the shutter speed and the opening of the diaphragm set at that time is not suitable thus causing an over exposure. This means that the user must decrease the opening of the iris diaphragm or increase the shutter speed.

On the other hand when the brightness of the object is low satisfying a relation $V_{b1} > V_{b2} - V_{off}$, then transistors $Q_1$, $Q_4$, $Q_5$, $Q_6$ and $Q_7$ are all rendered on whereas transistor $Q_8$ is off. As a result, transistor $Q_9$ is rendered off, transistor $Q_{10}$ is also off, and only transistor $Q_{11}$ is rendered on. The on-state of transistor $Q_{11}$ lights display lamp $LD_3$ to illuminate arrow 4 on the display board 1, thereby alarming that the combination of the presently set shutter speed and the opening of the iris diaphragm causes an under exposure.

In response to the alarm and request described above, when the user adjusts the diaphragm opening 5 or shutter speed, that is variable resistor $RV_1$, transistors $Q_1$ and $Q_2$ will approach a balanced condition. When the balanced condition $V_{b1} = V_{b2} - V_{off}$ is reached, the operation of the circuit becomes quite unstable. More particularly, when transistor $Q_7$ is turned on and transistor $Q_8$ is turned off, or when transistor $Q_7$ is turned off and transistor $Q_8$ is turned on, notwithstanding the transient time constant provided by capacitor $C_2$ and resistor $R_4$, a voltage is positively fed back to the base electrode of transistor $Q_2$ and when the amount of feedback reaches a value that upsets the balanced state, an oscillation will result. The reason why the differential circuit is inverted by the fedback voltage thereby to prevent oscillation under the stable condition, that is, in the case of over exposure or under exposure, is as follows. Thus, in the case of over exposure, the base potential of transistor $Q_2$ is higher than the base potential of transistor $Q_1$ thereby turning off transistor $Q_1$, turning on transistor $Q_2$, turning off transistor $Q_7$ and turning on the transistor $Q_8$ so that the upper terminal of capacitor $C_2$ connected to the collector electrode of transistor $Q_7$ is charged to the voltage of the source E whereas the lower terminal is charged to the base voltage of transistor $Q_2$. Then resistor $R_4$ is connected in parallel with the variable resistor $RV_3$ across the base electrode of transistor $Q_2$ and the ground with the result that the fractional voltage provided by the variable resistor $RV_3$ is decreased by the parallel connection of resistor $R_4$. However, since the circuit constants are selected such that said decrease in the fractional voltage will be smaller than the difference between the base potentials of transistors $Q_1$ and $Q_2$, the differential circuit will not invert. On the other hand, in the case of under exposure, the base potential of transistor $Q_2$ is lower than the base potential of transistor $Q_1$ so that transistor $Q_1$ is turned on, transistor $Q_2$ is turned off, transistor $Q_7$ is turned on and transistor $Q_8$ is turned off. Accordingly, the upper terminal of capacitor $C_2$ which is connected to the collector electrode of transistor $Q_7$ is charged to the ground potential whereas the lower terminal of $C_2$ has the base potential of transistor $Q_2$. Then resistor $R_4$ is connected in parallel with the variable resistor $RV_3$ between the base electrode of transistor $Q_2$ and the positive pole of the source E, thus increasing the base potential of transistor $Q_2$. However, since the circuit constants are selected such that this increase in the base potential of transistor $Q_2$ will be smaller than the difference between the base potentials of transistors $Q_1$ and $Q_2$, in this case too, the differential circuit will not be inverted.

Under the oscillation condition, transistors $Q_7$ and $Q_8$ are repeatedly turned on and off thus applying an alternating voltage to the base electrodes of transistors $Q_9$ to $Q_{11}$ inclusive. Since the time constants provided by resistor $R_6$ and capacitor $C_3$, and by resistor $R_8$ and capacitor $C_5$, respectively, are made to be larger than the time constant provided by resistor $R_4$ and capacitor $C_2$, the base potentials of transistors $Q_9$ and $Q_{11}$ are maintained near the reference potential so that these transistors are maintained in their off-state. Since the base electrode of transistor $Q_{10}$ is impressed with the alternating voltage through capacitor $C_4$, transistor $Q_{10}$ is alternately rendered on and off. As a result, only the display lamp $LD_2$ is alternately energized and deenergized to display the correct exposure by symbol 3 on the display board 1.

As has been described hereinabove, when the movable contact of transfer switch $SW_2$ is thrown to contact b connected to capacitor $C_1$ in response to the opening motion of the shutter while the variable resistor $RV_1$ or the opening of the diaphragm 5 is adjusted to a proper value, the switch $SW_1$ is opened in response to the movement of the blades of shutter. Then, the voltage $V_{b1}$ across the capacitor $C_1$ increases with a time constant determined by the values of variable resistor $RV_2$ and capacitor $C_1$ and at an instant when transistor $Q_8$ is turned on an electromagnet Mg is energized to release the blade whereby the shutter is closed and the photographing operation is completed.

With the circuit construction described above a comparator circuit constituted by the differential amplifier operates to compare the magnitudes of the voltages respectively corresponding to the photosensitivity of the film used and the brightness of the object for displaying over exposure and under exposure conditions. Further, in the case of a correct exposure, a voltage is positively fed back to the differential amplifier to cause it to oscillate thus displaying the correct exposure condition. It is also possible to control the shutter speed by setting the shutter time in accordance with the operation for establishing a correct exposure condition and by switching the transfer switch immediately prior to the operation of the shutter.

Although in the illustrated embodiment a photoconductive element was used as means for detecting the brightness of the object, it will be clear that the photoconductive element may be substituted by any other circuit network or device that varies its output current in accordance with the amount of light received, for example a constant current circuit including a memory circuit.

What is claimed is:

1. An electric exposure circuit for use in a photographic camera having a shutter and an over and under exposure display means, comprising means responsive to the brightness of an object to be photographed for producing a first signal representing said brightness, a first transistor normally connected to respond to said first signal of said brightness responsive means, an adjustable resistor settable in accordance with the photosensitivity of the photographic film used, a voltage divider circuit including said adjustable resistor and a second transistor connected to respond to the output voltage of said adjustable resistor, circuit means connecting said first and second transistors as a differential amplifier for comparing the relative magnitude of said voltage and said first signal, means responsive to the comparison output signal of said differential amplifier which is produced when said differential amplifier is unbalanced in opposite directions for operating said over and under exposure display means to display respectively an over exposure or an under exposure condition, a positive feedback circuit connected to said differential amplifier, means responsive to the balanced condition of said differential amplifier for actuating said positive feedback circuit to cause said differential amplifier to oscillate, and means responsive to the oscillation of said differential amplifier for displaying a correct exposure condition.

2. The electric shutter exposure circuit according to claim 1 which further comprises a second variable resistor which is set in accordance with a predetermined shutter time, a capacitor connected to be charged through said second variable resistor, a first switch connected for normally short circuiting said capacitor and arranged to be opened substantially at the time that said shutter of the camera is opened, an electromagnet coupled for operating said shutter and connected on the output side of said differential amplifier, and a transfer swtich operated concurrently with said first switch for connecting said first transistor to be responsive to the terminal voltage of said capacitor, so that as said capacitor is charged up said differential amplifier operates said electromagnet to close said shutter.

3. The electric shutter exposure circuit according to claim 1 wherein said last mentioned means comprises a capacitor and a transistor connected to respond to said comparison output signal of said differential amplifier through said capacitor.

4. The electric shutter exposure circuit according to claim 1 wherein said positive feedback is applied through a time constant circuit having a predetermined time constant and said means responsive to the unbalanced condition of said differential amplifier has a time constant larger than that of said time constant circuit.

5. In an electric shutter exposure circuit for use in a photographic camera having a shutter with an iris diaphragm, a variable shutter time setting circuit, a light quantity information circuit including means for adjusting the quantity of light received from an object in accordance with the opening of said iris diaphragm of said camera and said shutter time setting circuit, a comparator circuit for comparing one of the light quantity information signals produced by said light quantity information circuit or a shutter time information produced by said shutter time setting circuit with a predetermined reference quantity for producing a non-oscillatory over exposure signal or under exposure signal, circuit means for producing an over exposure indication and under exposure indication corresponding respectively to said over exposure signal and under exposure signal produced by said comparator circuit the improvement characterized by providing a correct exposure indication when said light quantity information circuit produces a correct exposure signal, comprising the steps of positively feeding back a voltage to said comparator circuit through a first time delay for causing said comparator circuit to oscillate in response to said correct exposure signal thereby producing an alternating current signal, providing a time delay larger than said first time delay for said over exposure signal and said under exposure signal to suppress indication thereof in the presence of said alternating current signal, and displaying the presence of said alternating current signal as an indication of a correct exposure condition.

* * * * *